(12) United States Patent
Barlow et al.

(10) Patent No.: US 12,543,719 B2
(45) Date of Patent: Feb. 10, 2026

(54) PEST MONITORING DEVICE

(71) Applicant: SYNGENTA CROP PROTECTION AG, Basel (CH)

(72) Inventors: Thomas Barlow, Cambridge (GB); Merissa Sarrias, Cambridge (GB); Alun James, Cambridge (GB); Jonathan Campbell, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 91 days.

(21) Appl. No.: 17/998,566

(22) PCT Filed: May 12, 2021

(86) PCT No.: PCT/EP2021/062643
§ 371 (c)(1),
(2) Date: Nov. 11, 2022

(87) PCT Pub. No.: WO2021/228950
PCT Pub. Date: Nov. 18, 2021

(65) Prior Publication Data
US 2023/0189780 A1 Jun. 22, 2023

(30) Foreign Application Priority Data
May 13, 2020 (EP) .................... 20174414

(51) Int. Cl.
*A01M 1/02* (2006.01)
*A01M 1/14* (2006.01)
*G06F 18/22* (2023.01)

(52) U.S. Cl.
CPC ............ *A01M 1/026* (2013.01); *A01M 1/145* (2013.01); *G06F 18/22* (2023.01)

(58) Field of Classification Search
CPC ...... A01M 1/026; A01M 1/023; A01M 1/103; A01M 1/14; A01M 1/10; A01M 1/106; A01M 1/02; G06T 7/136; G06T 7/10
See application file for complete search history.

(56) References Cited

U.S. PATENT DOCUMENTS

| | | | |
|---|---|---|---|
| 6,266,439 B1 * | 7/2001 | Pollard | G60K 9/00 382/164 |
| 8,693,778 B1 * | 4/2014 | Landwehr | G06K 9/00 382/170 |

(Continued)

FOREIGN PATENT DOCUMENTS

| | | |
|---|---|---|
| CN | 107072186 A | 8/2017 |
| CN | 110428374 A | 11/2019 |

(Continued)

OTHER PUBLICATIONS

WIPO; App. No. PCT/EP2021/062643; International Search Report and Written Opinion dated Jul. 30, 2021.

(Continued)

*Primary Examiner* — Morgan T Jordan
*Assistant Examiner* — Carly W. Lynch
(74) *Attorney, Agent, or Firm* — BakerHostetler; Toni-Junell Herbert (57) ABSTRACT

A pest monitoring device is disclosed. The pest monitoring device includes a housing; an optical sensor configured to generate optical data related to an interior surface within the housing; and a processor in communication with the optical sensor. The processor is configured to receive optical data from the optical sensor; select optical data relating to at least one segment of the interior surface, the optical data relating to the at least one segment being arranged as a plurality of pixels. The processor is further configured to evaluate if the optical data corresponding to the least one segment meets a pre-determined condition associated with the interior sur- (Continued)

face by: counting the number of pixels of the plurality of pixels which indicate a light intensity below a pre-determined intensity value; and determining if the number of pixels having a light intensity below the pre-determined intensity limit is greater than or equal to a pre-determined pixel threshold value. The processor is further configured to determine, based on whether the optical data corresponding to the at least one segment meets the pre-determined condition associated with the interior surface, if there is an indication of a pest on the interior surface. A method of monitoring a pest trap is also disclosed.

10 Claims, 8 Drawing Sheets

(56) References Cited

U.S. PATENT DOCUMENTS

| | | |
|---|---|---|
| 11,432,542 B2 | 9/2022 | Howard et al. |
| 2003/0213161 A1 | 11/2003 | Gardner et al. |
| 2015/0324993 A1* | 11/2015 | Stein ............... G06V 10/235 |
| | | 382/164 |
| 2016/0235050 A1 | 8/2016 | Janét et al. |
| 2016/0260207 A1* | 9/2016 | Fryshman ............ A01M 1/06 |
| 2018/0027795 A1* | 2/2018 | Janét ................. A01M 1/026 |
| 2018/0210064 A1 | 7/2018 | Send et al. |
| 2019/0220632 A1* | 7/2019 | Sengstaken, Jr. ...... A61J 1/035 |
| 2020/0011714 A1* | 1/2020 | Günther ............... G01D 9/00 |

FOREIGN PATENT DOCUMENTS

| | | | |
|---|---|---|---|
| JP | 2008-99598 A | 5/2008 | |
| WO | WO2015185063 | * 12/2015 | ............ A01M 23/24 |
| WO | 2016130182 A1 | 8/2016 | |
| WO | 2019138242 A1 | 7/2019 | |

OTHER PUBLICATIONS

Notification of the First Office Action issued in Chinese Patent Application No. 202180035198.5 dated May 30, 2025, with English translation, 20 pages.

* cited by examiner

PEST MONITORING DEVICE

CROSS-REFERENCE TO RELATED APPLICATIONS

This application is a 371 National Stage Application of International Application No. PCT/EP2021/062643, filed May 12, 2021, which claims priority to EP 20174414.1, filed May 13, 2020, the entire contents of which are each incorporated by reference herein.

The present invention relates to a pest monitoring device and a method of monitoring a pest trap.

BACKGROUND

A pest is a term used to describe a nuisance animal or insect. Examples of pests may include rodents, flies, cockroaches and bed bugs. In domestic and commercial environments pests can be a nuisance, unsightly and/or a health risk. It is often difficult to detect the presence of pests without directly encountering them. Additionally, common pests such as fleas, cockroaches and bedbugs are nocturnal, therefore the chances of detection by personal encounter is reduced. It is therefore known to install traps for detection of a variety of pests. These traps act to capture pests, such that upon inspection the presence of a pest may be indicative of a pest infestation.

It is common for proprietors of domestic and commercial environments to take measures to continually monitor premises in order to identify a pest problem. In particular, larger commercial establishments, for example hotels, may wish to monitor for pests as a preventative measure. This allows them to catch potential infestations early, so as to reduce the expense in eradicating an infestation.

Often due to the size of premises multiple detection devices will be installed. Previously pest traps had to be manually checked for the presence of a pest. This required at least one user to regularly check all of the traps on a premises, which is time consuming. Moreover, even empty traps must be checked as there was no way of knowing if a trap contained a pest.

It is therefore common to use monitoring devices within pest traps to eliminate the need to check traps which are most likely empty. However, a constant monitoring of a pest trap can be highly power intensive. As such, the monitoring devices often require that the pest trap is plugged into an outlet in order to meet the high-power requirements. This means the trap cannot be positioned in the most suitable area to capture a pest.

Alternatively, some devices may be battery operated. However, the high-power requirements means batteries must be replaced regularly. This causes an increased cost to the end user.

WO2016/130182 A1 discloses an automated insect monitoring system including a housing, an interior chamber within the housing and a light source arranged within the housing to illuminate at least a portion of a floor surface of the interior chamber.

WO 2019/138242 A1 discloses a system for detecting the presence of pests using a networked detection system including a camera system. In this system, reference data associated with the target pest is used for detecting the presence of pests. This can be power intensive (for example requiring high memory capabilities).

BRIEF SUMMARY

According to a first aspect of the present invention there is provided a pest monitoring device, that comprises a housing, a surface within the housing; an optical sensor configured to generate optical data related to an interior surface within the housing; and a processor in communication with the optical sensor.

In one embodiment, the processor is configured to: receive optical data from the optical sensor; select optical data relating to at least one segment of the interior surface, and arrange the optical data relating to the at least one segment being as a plurality or block of pixels. The processor may further evaluate if the optical data corresponding to the least one segment meets a pre-determined condition associated with the interior surface by: (1) counting the number of pixels of the plurality of pixels which indicate a light intensity below a pre-determined intensity value; (2) determining if the number of pixels having a light intensity below the pre-determined intensity limit is greater than or equal to a pre-determined pixel threshold value; and (3) determine, based on whether the optical data corresponding to the at least one segment meets the pre-determined condition associated with the interior surface, if there is an indication of a pest on the interior surface. Suitably, the interior surface includes a tack or adhesive substance thereon for immobilising pests. Alternatively, the surface comprises a pitfall trap.

According to a second aspect of the present invention a pest trap comprising the device described herein is provided.

According to a third aspect of the present invention there is provided a kit of parts for providing a pest monitoring device, the kit of parts comprising: first housing having an interior surface for accommodating pests thereon a second housing having an interior surface for accommodating pests thereon; a casing, wherein the casing is configured such that in use the casing may be releasably coupled to either the first housing or the second housing.

Suitably, the casing houses: an optical sensor configured to generate optical data related to an interior surface within either the first or second housing; and a processor in communication with the optical sensor, wherein the processor is configured to: receive optical data from the optical sensor; select optical data relating to at least one segment of the interior surface of the first or second housing.

According to a fourth aspect of the present invention there is provided a method of monitoring a pest trap, the method comprising: generating optical data related to an interior surface within a housing; select optical data relating to at least one segment of the interior surface, the optical data relating to the at least one segment being arranged as a plurality of pixels; evaluating if the optical data corresponding to the least one segment meets a pre-determined condition associated with the interior surface of the housing by: counting the number of pixels of the plurality of pixels which indicate a light intensity below a pre-determined intensity value; and determining if the number of pixels having a light intensity below the pre-determined intensity limit is greater than or equal to a pre-determined pixel threshold value; and determining, based on whether the optical data corresponding to the at least one segment meets the pre-determined condition associated with the interior surface, if there is an indication of a pest on the interior surface within the housing.

Aptly, the method of the fourth aspect of the present invention is performed using the device of the first aspect of the invention.

Certain aspects of the present invention provide the advantage that a pest monitoring device is provided with reduced processing requirements and hence reduced power consumption compared to known systems. In certain aspects this allows for increased mobility of the pest monitoring device in that the device (as a result of the reduced power consumption) is not limited to a mains power connection or regular battery replacements.

BRIEF DESCRIPTION OF THE DRAWINGS

Examples of the present invention will now be described hereinafter, by way of example only, with reference to the accompanying drawings in which.

In the drawings like reference numerals refer to like parts.

As used herein the term 'pest' is used to describe a nuisance animal or insect. Examples of pests may include (but is not limited to) rodents, flies, fleas, cockroaches and bed bugs.

As used herein the term 'housing' refers to a container having a substantially enclosed interior surface. For example, the housing may include an assembly of bounding walls surrounding/defining an interior surface (for example a base) therebetween.

As used herein the term 'segment of a surface' or 'segment of an interior surface' refers to a section or area of a surface. For example, the segment of a surface may refer to the field of view of an optical sensor directed toward the surface (or the field of view of a pixel of a multi-pixel optical sensor).

As used herein the term 'block' refers to a discretized block or (sub)set of the optical data related to a surface or interior surface that is received from an optical sensor directed thereto. For example, a processor can be configured to discretize the received optical data related to a surface into a plurality of discretized blocks or sets, each block including optical data corresponding to a separate segment of the surface wherein the optical data relating to a segment of the surface may include a plurality of pixels.

As used herein the term 'pre-determined condition associated with an interior surface' indicates that the pre-determined condition relates to properties or a state of the surface itself rather than a pest thereon (or more particularly the expected properties or state of the surface without a pest thereon). For example, the pre-determined condition may relate to the expected intensity of light reflected from the surface for a given ambient/applied light (for example the pre-determined condition may concern the number of pixels below an expected light intensity).

As used herein an 'indication of a pest on a surface' is a suggestion/assertion, supported by conclusions drawn from corresponding optical data, that a pest is present rather than a positive conclusion that a pest is present on the interior surface.

As used herein "monitoring components' for operating a pest monitoring device' refers to means for detecting pests within the pest monitoring device. For example, the means for detecting pests may include the processor, optical sensor, power source, LED of the pest monitoring device.

DETAILED DESCRIPTION

In accordance with the present invention, in a first aspect there is provided a pest monitoring device, that comprises a housing, a surface within the housing; an optical sensor configured to generate optical data related to an interior surface within the housing; and a processor in communication with the optical sensor.

Aptly, the processor is configured to discretize the received optical data into a plurality of discretized blocks, each discretized block including optical data corresponding to a separate segment of the interior surface. Preferably, the processor is further configured to evaluate if the optical data corresponding to a plurality of segments of the interior surface meets a pre-determined condition.

In a preferred embodiment, the processor is configured to determine if there is an indication of a pest on the interior surface within the housing, by determining if there is a plurality of adjacent segments each having corresponding optical data that meets the pre-determined condition; and determining if the plurality of adjacent segments contains a number of segments that is greater than or equal to a pre-determined segment threshold value.

In another embodiment, the device comprises communication means configured to transmit information to an external receiver, wherein the processor is configured to instruct the communication means to transmit information to the external receiver if an indication of a pest is determined.

In a preferred embodiment, the transmitted information comprises the optical data corresponding to the segments of the interior surface from which an indication of a pest has been determined. The optical data may comprise an image of the surface being interrogated.

In a further embodiment, the processor is further configured to assign an indication that the optical data corresponding to the at least one segment has met the pre-determined condition associated with the interior surface.

In another embodiment, the processor is further configured to assign the indication that the optical data corresponding to the at least one segment has met the pre-determined condition associated with the interior surface only if: the at least one segment was one of the plurality of adjacent segments, the optical data for which met the pre-determined condition associated with the interior surface and from which it was determined that there was an indication of a pest on the interior surface.

In yet another embodiment, the processor is further configured to receive further optical data from the optical sensor; select at least one segment of the interior surface for which further optical data, arranged as a plurality of pixels, has been generated by the optical sensor; and determine if there is an indication that optical data corresponding to the at least one segment has previously met the pre-determined condition associated with the interior surface. In this way, it may be evaluated if the further optical data corresponding to the at least one segment of the interior surface meets the pre-determined condition associated with the interior surface. In one embodiment, such evaluation is done only if there is no indication that optical data corresponding to the at least one segment has previously met the pre-determined condition. After the evaluation is done on and determine from the evaluation if there is an indication of a pest on the interior surface.

In one embodiment, the optical data includes light intensity.

In another embodiment, the device further comprises a controller configured to switch the device between an active mode and a standby mode.

In a further embodiment, the optical sensor and the processor are releasably coupled to the housing. Preferably, the device further includes a casing, wherein the optical sensor and the processor are at least partially housed within the casing, wherein the casing is releasably coupled to the housing.

In a preferred embodiment, the device further comprises a battery as a power source.

According to a second aspect of the present invention a pest trap comprising the device described herein is provided.

According to a third aspect of the present invention there is provided a kit of parts for providing a pest monitoring device as described herein. In one embodiment, the optical data received by the processor in the kit relates to at least one segment of the interior surface of the first or second housing of the kit relates to the at least one segment being arranged as a plurality of pixels; evaluate if the optical data corresponding to the least one segment meets a pre-determined condition associated with the interior surface of the first or second housing by: counting the number of pixels of the plurality of pixels which indicate a light intensity below a pre-determined intensity value; and determining if the number of pixels having a light intensity below the pre-determined intensity limit is greater than or equal to a pre-determined pixel threshold value; determine, based on whether the optical data corresponding to the at least one segment meets the pre-determined condition associated with the interior surface of the first or second housing, if there is an indication of a pest on the interior surface of the first or second housing.

According to a fourth aspect of the present invention there is provided a method of monitoring a pest trap. Aptly, the method of the fourth aspect of the present invention is performed using the device of the first aspect of the invention.

In one embodiment, the method comprises the step of discretizing the optical data into a plurality of discretized blocks, each discretized block including optical data corresponding to a separate segment of the interior surface.

In another embodiment, the step of evaluating if the optical data corresponding to a plurality of segments of the interior surface meets a pre-determined condition.

In a further embodiment, the step of determining from the evaluation if there is an indication of a pest on the interior surface within the housing comprises: determining if there is a plurality of adjacent segments each having corresponding optical data that meets the pre-determined condition; and determining if the plurality of adjacent segments contains a number of segments that is greater than or equal to a pre-determined segment threshold value.

In a preferred embodiment, the method comprises the step of transmitting information to an external receiver if an indication of a pest is determined.

Additionally, it is preferred that the transmitted information comprises the optical data corresponding to the segments from which an indication of a pest has been determined.

Most preferably, an image of the surface is transmitted.

In one embodiment, the method also comprises the step of assigning an indication that the optical data corresponding to the at least one segment has met the pre-determined condition.

In a further embodiment, the indication that the optical data corresponding to the at least one segment has met the pre-determined condition is only assigned if the at least one segment was one of the plurality of adjacent segments, the optical data for which each met the pre-determined condition and from which it was determined that there was an indication of a pest on the interior surface.

In another embodiment, the method includes the steps of: generating further optical data related to the interior surface; selecting at least one segment of the interior surface for which further optical data has been generated; determining if there is an indication that optical data corresponding to the at least one segment has previously met the pre-determined condition; evaluating if the further optical data corresponding to the at least one segment of the interior surface meets a pre-determined condition only if there is no indication that optical data corresponding to the at least one segment has previously met the pre-determined condition; and determining from the evaluation if there is an indication of a pest on the interior surface within the housing.

In another embodiment, evaluating if the further optical data corresponding to the at least one segment of the interior surface meets a pre-determined condition and transmitting optical information to an external receiver only if there is an indication from the optical data that the number of segments meeting the pre-determined condition is greater than the number of segments that have previously met the pre-determined condition.

In a further embodiment, the indication that the optical data corresponding to the at least one segment has met the pre-determined condition is only assigned if the at least one segment was one of the plurality of adjacent segments, the optical data for which each met the pre-determined condition and from which it was determined that there was an indication of a pest on the interior surface.

Figure 1A:
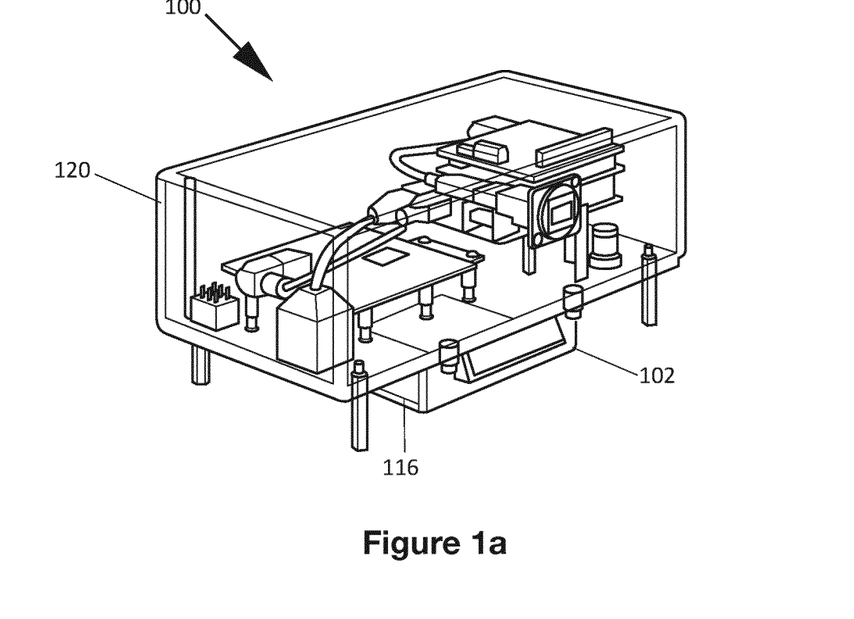
FIGS. 1a and 1b illustrate plan views (transparent and exploded views) of an example pest monitoring device.
Figure 1B:
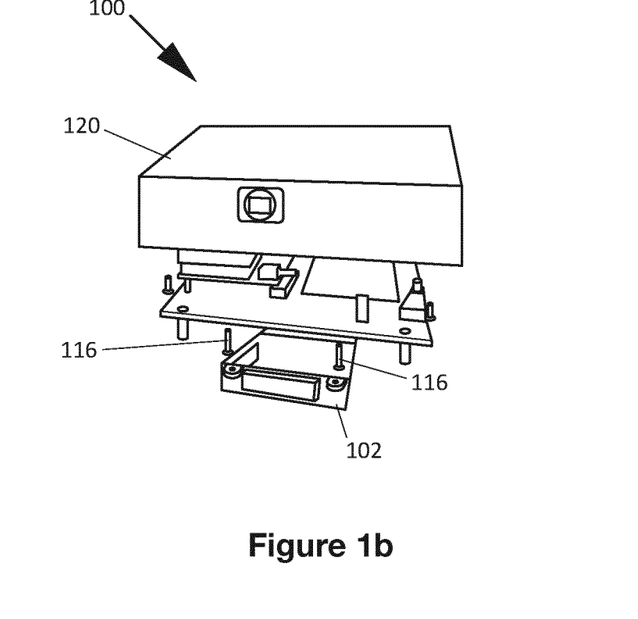
Figure 2:
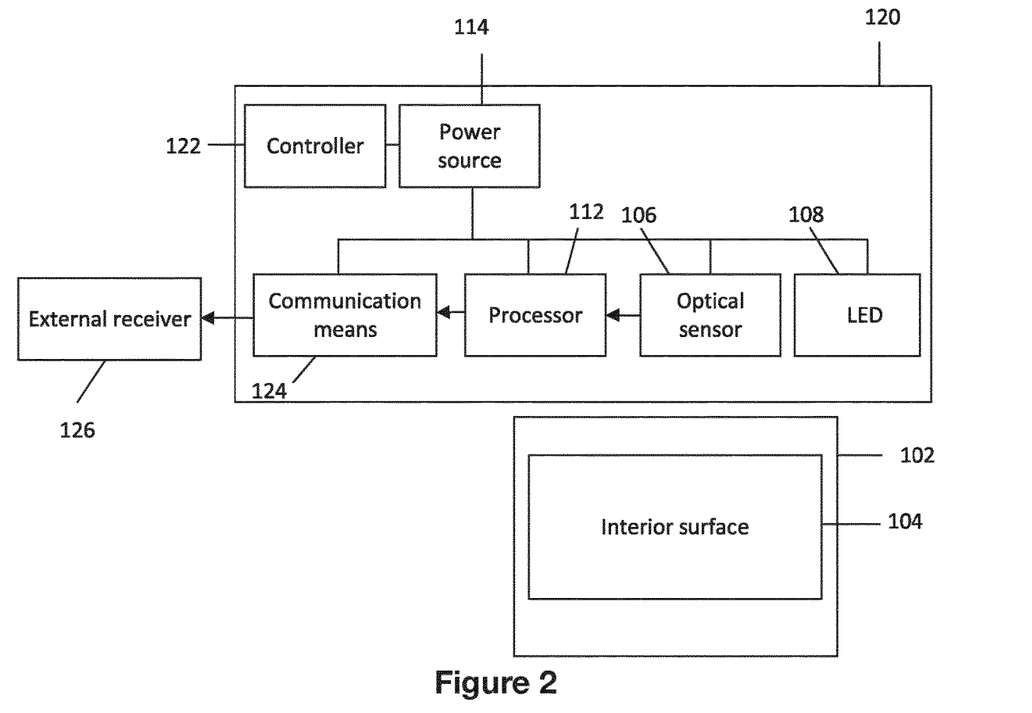
FIG. 2 illustrates a schematic diagram of an example pest monitoring device.
Figure 3A:
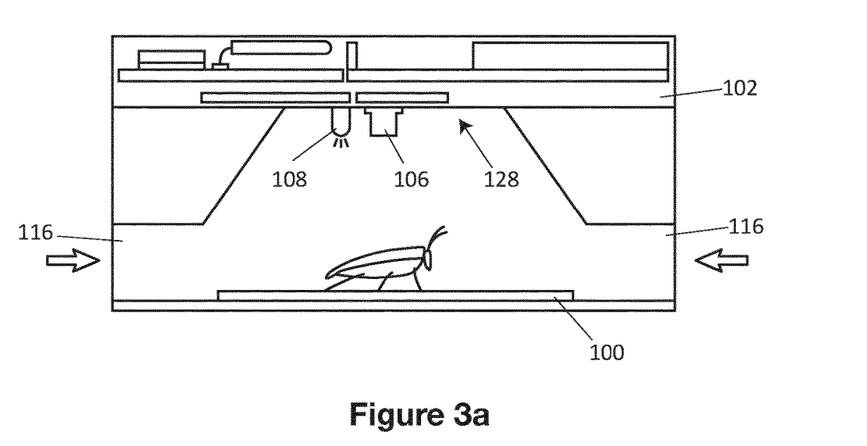
FIGS. 3a and 3b illustrate cross-section and plan views of an example pest monitoring device in use.
Figure 3B:
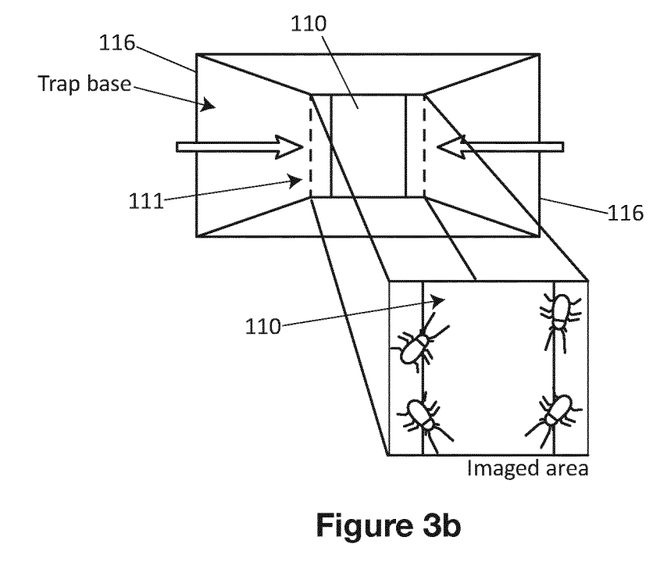

FIGS. 1a and 1b illustrate an example of a pest monitoring device 100 according to the present disclosure. FIG. 2 illustrates the pest monitoring device 100 illustrated schematically. FIGS. 3a and 3b illustrate the pest monitoring device 100 in use.

The pest monitoring device 100 includes a housing 102. An interior surface 104 is defined within the housing 102 for receiving/accommodating pests thereon. In general, the interior surface 104 may be any surface housed within the housing 102 (i.e. located within the bounding walls of the housing 102). For example, the interior surface 104 may form part of the base or walls of the housing 102 (in this example the interior surface 104 is a base portion of the housing 102). The interior surface 104 may be configured in any suitable manner, for example the interior surface 104 may be flat or curved/sloped (such as a pitfall).

The housing 102 is configured to allow pest ingress therein. As such, pests can enter the housing 102 and access the interior surface 104. In this example, the housing 102 includes two entrances 116, positioned on opposing sides of the housing 102 to allow pest ingress from either side. The entrances 116 allow access to the interior of the housing 102 and therefore also the interior surface 104.

The entrances 116 may be configured in any suitable way depending on the type of pest being monitored by the pest monitoring device 100. In general, a wider entrance (for example spanning substantially the width or length of the housing 102) and tapering towards the interior surface 104 may be used to maximise the likelihood of ingress. However, narrower entrances may also be used. The path from the entrances 116 to the interior surface 104 may be configured in any suitable way. For example, the path from the entrances to the interior surface 104 may be flat or sloped (either upwardly or downwardly towards the interior surface 104).

As best shown in FIGS. 3a and 3b, the pest monitoring device 100 further includes an optical sensor 106 configured to generate optical data related to the interior surface 104 within the housing 102. In this example, the optical data generated by the optical sensor 106 includes light intensity reflected towards the optical sensor from the interior surface 104.

In this example the optical sensor 106 includes a camera arrangement directed towards the interior surface 104. In this example, the camera arrangement includes a multi-pixel camera, such that the optical data is arranged as a plurality of pixels.

In this example, the pest monitoring device 100 further includes illumination means configured to illuminate the interior surface 104 and aid the generation of optical data. In this example the illumination means is an LED 108. The LED 108 may be configured to generate white light, or light of a specific wavelength, for example 530 nm. In other examples, however, the pest monitoring device 100 may rely on ambient light only.

In this example (as best shown in FIGS. 3a and 3b) the interior surface 104 includes a tack or adhesive substance or substrate 110 thereon for immobilising pests (for example a sticky pad or a glueboard). In one embodiment, for packaging and shipping purposes, the adhesive layer of the substrate 110 can be covered by a release paper. The release paper is removed prior to use to expose the adhesive layer so pests can come into contact with the adhesive layer and become entrapped. In another embodiment, the adhesive substrate 110 (sticky pad or a glueboard) is disposable. In this embodiment, disposable glueboards are routinely replaced to ensure the continued efficacy of the pest monitoring device 100 and to dispose of the pests immobilized thereon. The adhesive substance or adhesively-coated substrate 110 may include, for example, an adhesive or adhesive composition that is a pressure sensitive adhesive, including water based resins or hot melt adhesives. In some embodiments, the adhesive is an acrylic polymer, butyl rubber, natural rubber, nitrile, silicone, styrene block copolymer, styrene-ethylene/propylene, styrene-isoprene-styrene, and/or vinyl ether adhesive or mixture thereof, for example.

In another embodiment, the interior surface 104 includes a pitfall trap (not shown) in lieu of or in addition to the substrate 110 to capture pests. The essential components of a pitfall trap are a container or pit with an interior wall that cannot be scaled by the pest. For example, a pest that falls into the trap will be unable to escape because it cannot climb up the interior wall In this example, the substrate 110 (and/or pitfall) is positioned in the field of view 111 of the optical sensor 106 to immobilise pests in a suitable position.

The pest monitoring device 100 further includes a processor 112 in communication with the optical sensor 106. The processor is configured to receive optical data from the optical sensor 106.

In this example, the pest monitoring device 100 includes a power source 114. In this example, a single power source is provided for all powered components (e.g. the processor 112, optical sensor 106, LED 108). In this example, the power source is a battery (for example, an AA battery), removing the reliance of the pest monitoring device 100 on mains power. Therefore, the pest monitoring device 100 can be positioned in the most suitable area to capture pests rather than solely in positions with access to mains power.

In this example, the 'monitoring components' for operating the pest monitoring device 100 (for example the optical sensor 106, LED 108, processor 112, power source 114) are at least partially positioned/housed within a casing 120, separate from but coupled to the housing 102. As best shown in FIG. 3a, the casing 120 includes a gap or window 128 configured to allow access to the housing 102 (for example the optical sensor 106 and LED 108 can view the interior surface 104 through the window 128).

Figure 4:
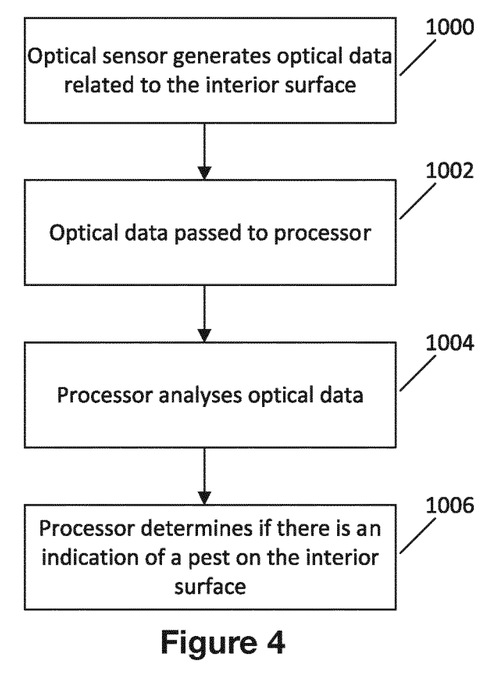
FIG. 4 illustrates a flow diagram for an example method of monitoring a pest trap.

As illustrated in FIG. 4, in general use of the pest monitoring device 100 the optical sensor 106 generates optical data related to the interior surface (step 1000). The optical data is passed to the processor 112 (step 1002), which then analyses the data (step 1004) to determine from the optical data if there is an indication of a pest on the interior surface 104 (step 1006).

Figure 5:
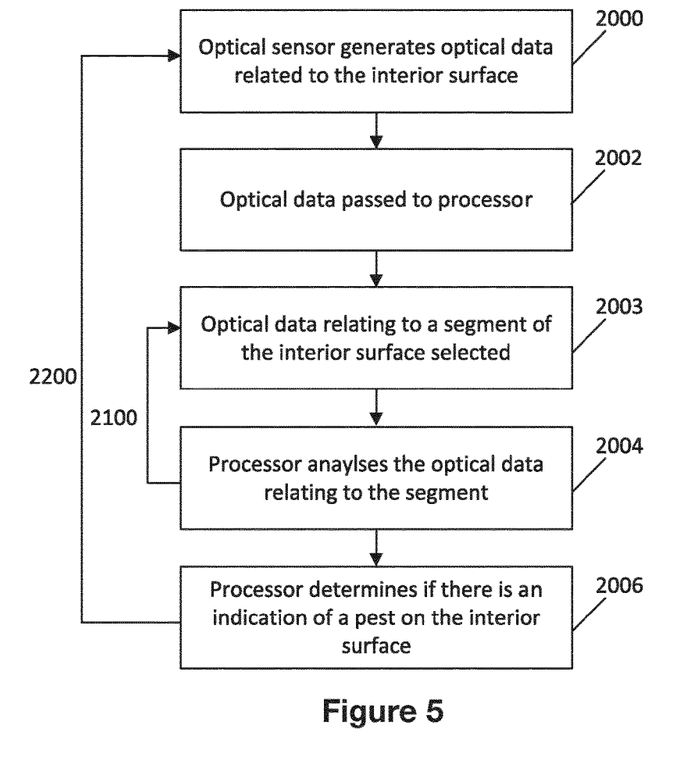
FIG. 5 illustrates a flow diagram for another example method of monitoring a pest trap.

FIG. 5 illustrates a method of monitoring for a pest using the pest monitoring device 100. The optical sensor 106 generates optical data related to the interior surface (step 2000). The optical data is passed to the processor 112 (step 2002), which selects optical data relating to a segment of the interior surface (step 2003). In this example, the optical data relating to the segment includes a plurality of pixels. The processor 112 analyses the optical data relating to the segment (step 2004) and then determines, from the analysis, if there is an indication of a pest on the interior surface (step 2006).

In some examples, the processor 112 may determine if there is an indication of a pest on the interior surface within the housing based on whether optical data corresponding to more than one segment meets the pre-determined condition associated with the interior surface. That is, following analysis of the optical data for a first segment, the processor 112 may select optical data relating to a further segment for analysis. This process may be repeated (for example until optical data relating to all the segments in the optical data set/image have been analysed) prior to making a determination on the likelihood or indication of a pest on the interior surface (as indicated by arrow 2100).

In this example, the processor 112 analyses the optical data to evaluate if the optical data corresponding to the segment (or each segment in turn) meets a pre-determined condition associated with the interior surface.

Figure 11:
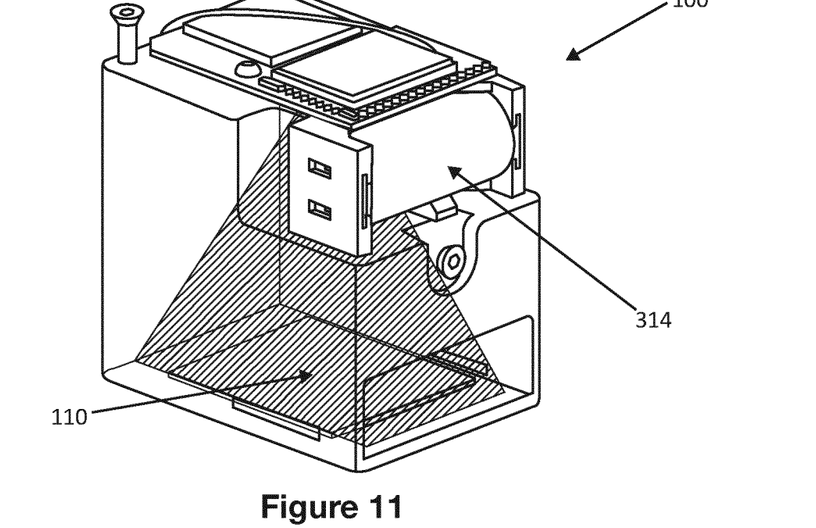
FIGS. 11 and 12 illustrate plan and side views (transparent), respectively, of an example pest monitoring device.
Figure 12:
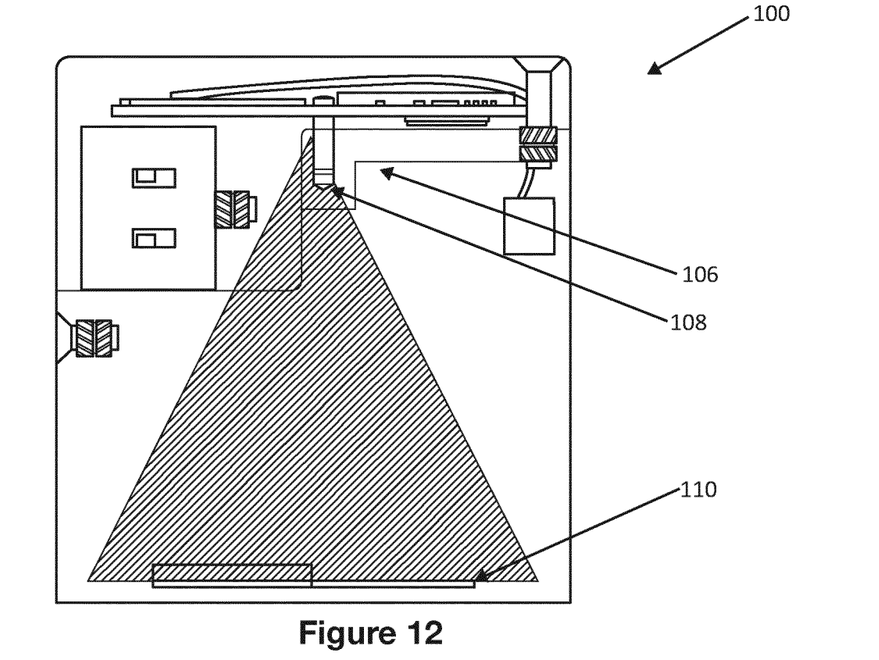

In this example, the pre-determined condition relates, in general, to an expected light intensity reflected from the surface when no pest is present. The reflected light may be ambient light or from LED 108 (see, e.g., light extending from LED 108 to surface 110 illustrated as shaded pyramid of FIG. 11 or shaded triangle of FIG. 12). In this example, the processor evaluates whether a pre-determined condition is met by counting 'dark' pixels (that is, pixels that are darker than expected for the interior surface).

Specifically, the processor 112 first counts the number of pixels of the plurality of pixels which indicate a light intensity below a pre-determined intensity value (that is, an intensity value corresponding to that expected without the presence of a pest). For example, about 10% of full intensity.

Secondly, the processor 112 determines if the number of pixels having a light intensity below the pre-determined intensity limit is greater than or equal to a pre-determined pixel threshold value. For example, about 80% of the total number of pixels in the respective block.

In an alternate embodiment, relative to an expected light intensity reflected from the surface when no pest is present, the processor evaluates whether a pre-determined condition is met by counting 'light' pixels (that is, pixels that are lighter than expected for the interior surface) to accommodate pests which have a light or reflective surface.

In this embodiment, the processor 112 first counts the number of pixels of the plurality of pixels which indicate a light intensity above a pre-determined intensity value (that is, an intensity value corresponding to that expected without the presence of a pest). For example, about 90% of full intensity.

Secondly, for the alternate embodiment, the processor 112 determines if the number of pixels having a light intensity above the pre-determined intensity limit is greater than or equal to a pre-determined pixel threshold value. For example, about 20% of the total number of pixels in the respective block.

Based on whether the optical data corresponding to the segment meets the pre-determined condition associated with the interior surface, the processor 112 determines if there is an indication of a pest on the interior surface (step 2006). Although the description which follows is provided in terms a pre-determined condition where a light intensity falls below a pre-determined intensity, it would be understood that similar steps may be elaborated to apply to the above-noted alternative embodiment (i.e., where a light intensity falls above a pre-determined intensity).

In a general sense, if the pre-determined condition has been met by the optical data relating to a segment the processor 112 may determine that there is an indication of a pest (and conversely, if the pre-determined condition has not been met the processor may determine that there is not an indication of a pest). In this example, however, the processor 112 determines if there is an indication of a pest on the interior surface by, firstly, determining if there is a plurality of adjacent segments each having corresponding optical data that meets the pre-determined condition; and then determining if the plurality of adjacent segments contains a number of segments that is greater than or equal to a pre-determined segment threshold value. It would be understood that a suitable block threshold value for determining if there is an indication of a pest may depend on the resolution of the optical sensor (i.e. the size of the pixels), field of view, and the pest being monitored. For example, for a small pest the block threshold value may be about 4 blocks, for a large pest the block threshold value may be about 20 blocks.

The process of data generation, analysis and determination may be repeated periodically to check for the arrival of additional pests (see arrow 2200).

Figure 6:
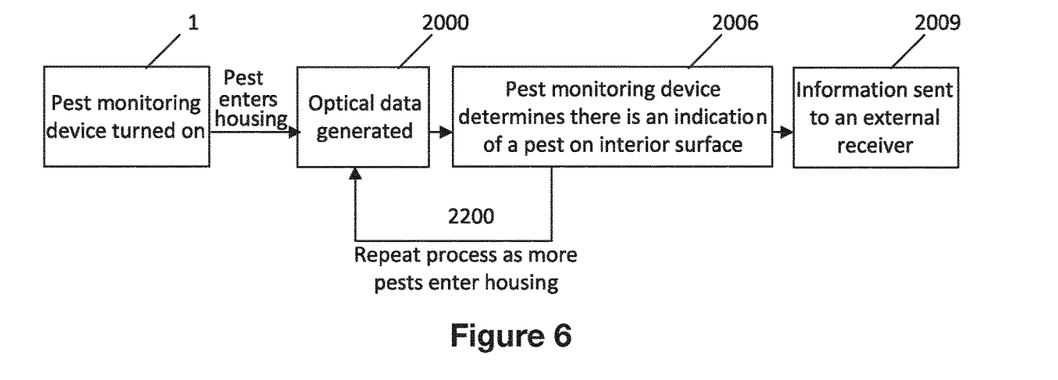
FIG. 6 illustrates a flow diagram for another example method of monitoring a pest trap.

FIG. 6 illustrates an example implementation of the method of FIG. 5. Initially the pest monitoring device 100 is turned on (step 1) and a pest enters the housing 102. Optical data is generated (step 2000), from which the pest monitoring device determines there is an indication of a pest on the interior surface, through the detection of 'dark' segment(s) (step 2006, with intermediate step 2004 not shown).

In this example, upon determination that there is an indication of a pest on the interior surface then information regarding the indication of a pest is transmitted to an external receiver 126 (step 2009). In this example, the pest monitoring device 100 includes a communication means 124 configured to transmit information to the external receiver 126. The processor 112 is configured to instruct the communication means 124 to transmit information to the external receiver 126 if an indication of a pest is determined.

The external receiver 126 may be configured to display the data for a user to visually check. The external receiver 126 may be a central receiving hub, connected to a plurality of pest monitoring devices 100.

The transmitted information may include the optical data corresponding to the segments from which an indication of a pest has been determined. In other examples, the transmitted information may include all optical data (i.e. the image of the interior surface).

Any suitable communication means may be used. For example, the communication means may be configured to transmit information via WiFi, Bluetooth or similar. In this example, the communication means includes a ZigBee communication hub.

The process is repeated periodically to check for the arrival of additional pests (see arrow 2200).

Figure 7:
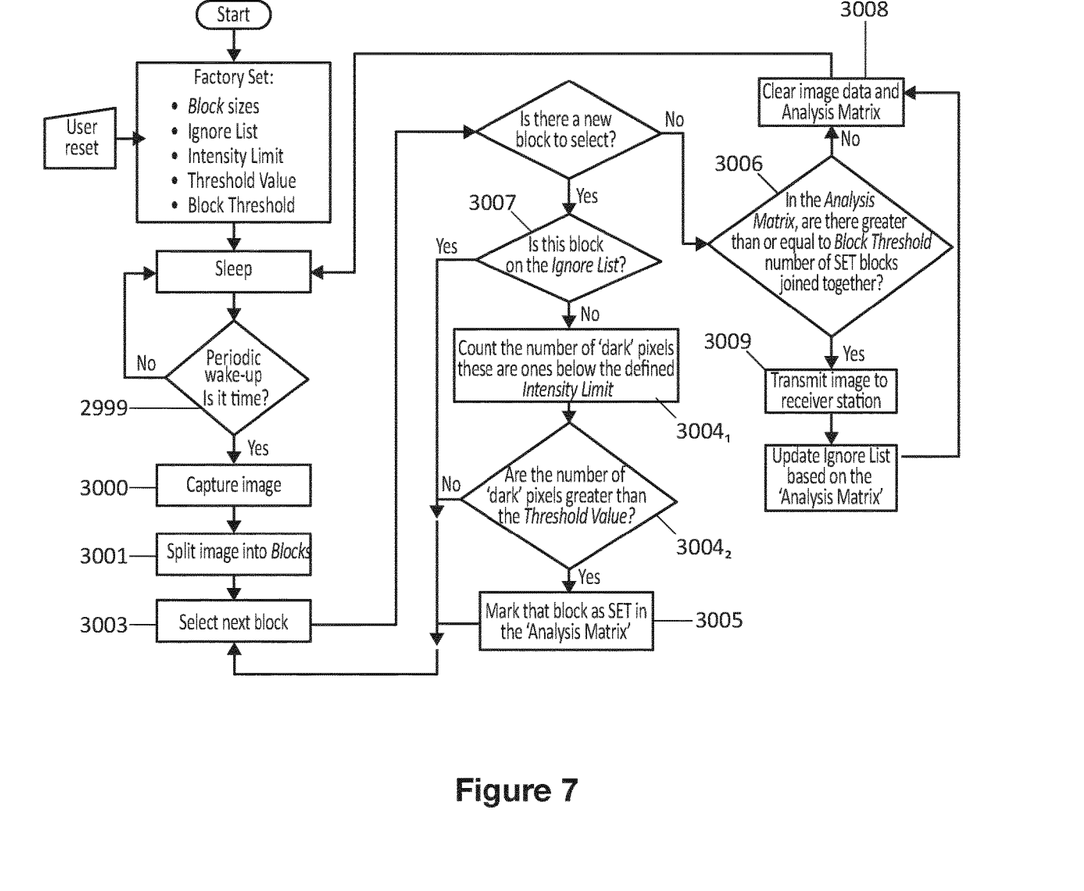
FIG. 7 illustrates a flow diagram for another example method of monitoring a pest trap.

FIG. 7 illustrates a method of monitoring for a pest using the pest monitoring device 100, corresponding in general to FIG. 5. For brevity some details of corresponding steps will not be repeated.

In this example, the pest monitoring device 100 has a sleep or standby mode, to help minimise power consumption better monitoring operations. That is, the pest monitoring device 100 is configured to monitor for a pest only intermittently to preserve battery live. In this example, the device further includes a controller 122 configured to switch the pest monitoring device 100 between an active mode (for monitoring operations) and the standby mode.

The processor 112 is configured to periodically instruct the controller 122 to 'wake up' the pest monitoring device 100 (step 2999 FIG. 7 or 3999 FIG. 7a)—that is, switch the pest monitoring device 100 from the standby mode to the active mode. The period between monitoring operations may depend on the pest being monitored (for example more active pests may require more frequent monitoring) and/or the battery life of the pest monitoring device 100 (for example a device with a longer battery life may allow more frequent monitoring, or less frequent monitoring may be used as the charge within the battery becomes depleted).

The optical sensor 106 generates optical data related to the interior surface (step 3000). In this example, the processor is configured to discretize the received optical data into a plurality of discretized blocks or sets (step 3001), each block including optical data corresponding to a separate segment of the interior surface. The number of blocks may be chosen according to the pest being monitored (for example larger blocks may be used for larger pests).

In general, the analysis of the interior surface comes from analysing all blocks of data (although some blocks, for example those relating to a segment of the surface including a corner or another redundant feature may be ignored). Following discretisation of the optical data, a block of optical data is selected (step 3003). The steps 3003-3009 may be carried out as described, for example, in the following embodiments 1 and 2.

Embodiment 1

As with the method of FIG. 5 as further detailed in FIG. 7, the processor 112 evaluates whether a pre-determined condition is met by counting the number of pixels of the plurality of pixels which indicate a light intensity below a pre-determined intensity value (step $3004_1$) and determining if the number of pixels having a light intensity below the pre-determined intensity limit is greater than or equal to a pre-determined pixel threshold value (step $3004_2$).

In this example, if the pre-determined condition is met the processor is further configured to assign, to the block, an indication that the pre-determined condition has been met. In this example, the indication is assigned by marking the block as SET within an analysis matrix (step 3005).

The method is repeated from step 3003 to process all the blocks to be analysed and a corresponding analysis matrix has been compiled. When all blocks have been analysed, the processor 112 determines from the analysis if there is an indication of a pest on the interior surface from the contents of the analysis matrix (step 3006). As noted above, each block in the analysis matrix corresponds to optical data from a particular segment of the surface (104) that has been interrogated by the optical sensor (106). Accordingly, the optical data from adjacent or neighbouring segments of the surface (104) corresponds to adjacent or neighbouring blocks that are—joined together—in the analysis matrix.

In this example (in a similar manner as for the method of FIG. 5), the determination of the likelihood or indication of a pest considers:
(1) Identification of the number "$(X^1)$", which is the number of blocks in the analysis matrix that are both (i) marked as SET (i.e., from step 3005) and (ii) which also are neighbouring/joined together within the analysis matrix with one or more other SET blocks; and
(2) Comparison of $(X^1)$ to a pre-determined block threshold value "(B)" (i.e. also designated as Block Threshold number) (see step 3006). For example, for a small pest the block threshold value (B) may be about 4 SET blocks joined together. For a large pest the block threshold value (B) may be about 20 SET blocks joined together.

If it is determined that there is no indication of a pest on the interior surface (i.e., $(X^1) \leq (B)$) the analysis matrix is cleared for future monitoring operations (step 3008).

If it is determined that there is an indication of a pest on the interior surface (104) (i.e., $(X^1) \geq (B)$), the optical data/image associated with such surface is transmitted to the external receiver 126 (step 3009). Following transmission (or alternatively before/concurrently with transmission), the blocks used to identify $(X^1)$(i.e., those that are both (i) marked as SET (step 3005) and (ii) neighbouring/joined together within the analysis matrix with one or more other SET blocks) are added to an 'ignore list'. That is, in this example the indication that the pre-determined condition was met is only maintained for a segment if that segment was one of the plurality of adjacent segments from which it was determined that there was an indication of a pest on the interior surface. Put another way, the processor is configured to assign (by way of the 'ignore list') an indication that particular blocks (correlated to optical data received from particular segments) contributed to a determination that there was an indication of a pest on the interior surface. The analysis matrix is then cleared for future monitoring operations (step 3008).

In this example, the pest monitoring device 100 is then sent to sleep and the above described process is repeated.

In further monitoring operations, once a new block is selected, the processor determines if there is an indication that the block has previously met the pre-determined condition (i.e. if the block is present on the ignore list—step 3007). If so, this block is ignored, and the processor attempts to select another block. If not, the monitoring operation continues to steps 3004$_{1,2}$ etc.

The indication that the block has previously met the pre-determined condition may ultimately be used to avoid analysis of the block during further iterations of the method, therefore reducing power consumption. That is, the processor may only analyse optical data relating to blocks, for which an indication of a pest has not been determined. This is particularly useful when the pests are slow moving or remain substantially stationary on the interior surface, for example as a result of being immobilised on a tack or adhesive substance.

Embodiment 2

As with the method of FIG. 5 as further detailed in FIG. 7*a*, the processor 112 evaluates whether a pre-determined condition is met by counting the number of pixels of the plurality of pixels which indicate a light intensity below a pre-determined intensity value (step 4004$_1$) and determining if the number of pixels having a light intensity below the pre-determined intensity limit is greater than or equal to a pre-determined pixel threshold value (step 4004$_2$). Further, a classic edge detection algorithm is used to improve the robustness of the system. Thereby the difference in intensity between neighbouring pixels is assessed and if the change is large enough then it is deemed to be an edge. In each row of the image block (see, e.g., illustration shown in chart 4020), only those pixels (4025) are counted which are in a sequence that are not only below the pre-determined intensity limit but are bounded at their left (L) end by a downward edge (so a sharp enough bright to dark transition) and at their right (R) end by an upward edge (so a sharp enough dark to bright transition).

In this embodiment, the determination of whether the change in intensity is large enough to constitute an edge is determined using a difference limit.

The intensity limit is determined by this equation:

Intensity Limit=(minimum intensity in that block)+ Intensity Ratio*(maximum intensity in that block)−(minimum intensity in that block)

The difference limit is determined by the equation:

Difference Limit=Difference Ratio*(maximum intensity in that block)−(minimum intensity in that block)

In this example, if the pre-determined condition is met the processor is further configured to assign, to the block, an indication that the pre-determined condition has been met. In this example, the indication is assigned by marking the block as SET within an analysis matrix (step 4005).

The method is repeated from step 4003 to process all the blocks to be analysed and a corresponding analysis matrix has been compiled. When all blocks have been analysed, the processor 112 determines from the analysis if there is an indication of a pest on the interior surface from the contents of the analysis matrix (step 4006). As noted above, each block in the analysis matrix corresponds to optical data from a particular segment of the surface (104) that has been interrogated by the optical sensor (106). Accordingly, the optical data from adjacent or neighbouring segments of the surface (104) corresponds to adjacent or neighbouring blocks that are—joined together—in the analysis matrix.

In this example (in a similar manner as for the method of FIG. 5), the determination of the likelihood or indication of a pest considers:
(1) Identification of the number "$(X^1)$", which is the number of blocks in the analysis matrix that are both (i) marked as SET (i.e., from step 4005) and (ii) which also are neighbouring/joined together within the analysis matrix with one or more other SET blocks; and (2) Comparison of ($X^1$) to a pre-determined block threshold value "(B)" (i.e. also designated as Block Threshold number) (see step 4006). For example, for a small pest the block threshold value (B) may be about 4 SET blocks joined together. For a large pest the block threshold value (B) may be about 20 SET blocks joined together.

If it is determined that there is no indication of a pest on the interior surface (i.e., ($X^1$)≤(B)) the analysis matrix is cleared for future monitoring operations (step 4008).

If it is determined that there is an indication of a pest on the interior surface (104) (i.e., ($X^1$)≥(B)), the optical data/image associated with such surface is transmitted to the external receiver 126 (step 4009). Following transmission (or alternatively before/concurrently with transmission), the blocks used to identify ($X^1$)(i.e., those that are both (i) marked as SET (step 4005) and (ii) neighbouring/joined together within the analysis matrix with one or more other SET blocks) are added to an 'ignore list'. That is, in this example the indication that the pre-determined condition was met is only maintained for a segment if that segment was one of the plurality of adjacent segments from which it was determined that there was an indication of a pest on the interior surface. Put another way, the processor is configured to assign (by way of the 'ignore list') an indication that particular blocks (correlated to optical data received from particular segments) contributed to a determination that there was an indication of a pest on the interior surface. The analysis matrix is then cleared for future monitoring operations (step 4008).

In this example, the pest monitoring device 100 is then sent to sleep and the above described process is repeated.

In further monitoring operations, once a new block is selected, the processor determines if there is an indication that the block has previously met the pre-determined condition (i.e. if the block is present on the ignore list—step 4007). If so, this block is ignored, and the processor attempts to select another block. If not, the monitoring operation continues to steps 4004$_{1,2}$ etc.

The indication that the block has previously met the pre-determined condition may ultimately be used to avoid analysis of the block during further iterations of the method, therefore reducing power consumption. That is, the processor may only analyse optical data relating to blocks, for which an indication of a pest has not been determined. This is particularly useful when the pests are slow moving or remain substantially stationary on the interior surface, for example as a result of being immobilised on a tack or adhesive substance.

Embodiment 3

Figure 7A:
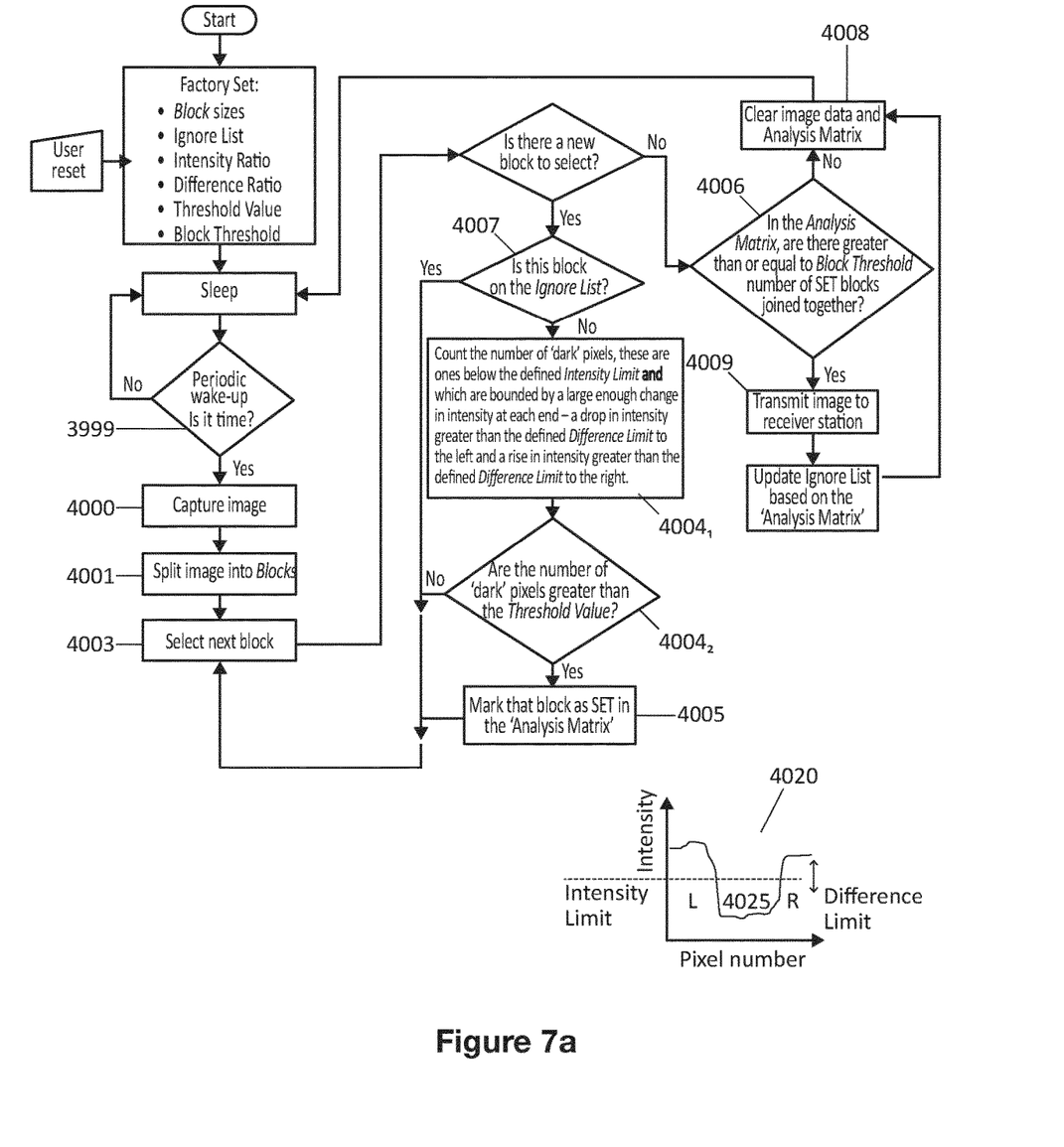
FIG. 7a illustrates a flow diagram for another example method of monitoring a pest trap.

In an alternate embodiment, steps (3003)-(3009) of FIG. 7 or steps (4003)-(4009) of FIG. 7a are followed as shown in embodiments 1-2 (above) but without an 'ignore list'. More particularly, instead of adding the specific blocks used to identify ($X^1$) to an 'ignore list, the processor 112 is configured to both store the numerical value of ($X^1$) and to increment a pest instance threshold value (Y). For example, upon detection of the first pest following steps (3003)-(3009) in embodiment 1 (i.e., where ($X^1$)≥(B)) or steps (4003)-(4009) of embodiment 2, the pest instance threshold (Y) would increase from zero (no pest present) to one (one pest present).

In this example, a subsequent monitoring operation identifies ($X^2$) as the number of neighbouring blocks that are SET in the analysis matrix (i.e., where ($X^2$)≥(B)) and also identifies that ($X^2$) is substantially equal to ($X^1$) (number of SET blocks from the previous monitoring operation). Even if such ($X^2$) blocks correspond to adjacent or neighbouring segments of the surface (104) that are in a different location from the segments of the previous monitoring operation, the presence of one pest still is indicated as, in this case, pest determination is based on the overall number of neighbouring SET blocks, not necessarily tied to their location. Hence, the pest instance threshold (Y) would remain the same (i.e., one pest present) even if the pest has moved to a different location on the surface (104). Accordingly, there is no need to re-transmit the optical data/image associated with such surface to the external receiver 126 (step 3009)/(step 4009).

The dynamic pest instance threshold approach of embodiment 3 is particularly useful when the pests are moving or do not remain substantially stationary on the interior surface, for example, as a result of being trapped in a pitfall or from moving to different locations on a surface.

In one embodiment, the pest evaluation in embodiment 3 is made if the further optical data corresponding to at least one segment of the interior surface meets a pre-determined condition such as a block threshold number. The optical information is transmitted to an external receiver only if there is an indication from the optical data that the number of segments meeting the pre-determined condition (for example, ($X^2$)) is greater than the number of segments that have previously met the pre-determined condition (for example, ($X^1$)).

Advantages

The above described embodiments provide the advantage that the pest monitoring device monitors for pests in a manner that is simpler and less power intensive than previously known devices.

For example, evaluation of the optical data uses a pre-determined condition which helps reduce the required memory and the associated power consumption in comparison to known evaluation methods (such as evaluation based on previously generated optical data for example). Moreover, the pre-determined condition is associated with the interior surface (rather than associated with a target pest, for example, which is more complicated and memory intensive as a result of storing pest-related data).

In general, the pre-determined condition relates to a counted number of pixels having a light intensity below a pre-determined intensity value, rather than the more complex image processing techniques used in other systems (for example, Haar cascades, kernel filtering, image descriptor methods and feature transforms). As such a more simple approach, which substantial image processing, is utilised which is less power intensive.

Modifications

Various modifications to the detailed designs as described above are possible. For example, the pest monitoring device (s) discussed above, may form part of a pest trap for capturing pests (in addition to simply monitoring pests).

In some examples, the processor may pre-process the optical data prior to analysis. For example, the processor may remove blocks of optical data (or add to the ignore list) which correspond to redundant areas of the surface (for example corners).

It would be understood that the structure and configuration of the pest monitoring device may vary from that described above. FIGS. 8 to 10b illustrate variations of the pest monitoring device 100.

Figure 8:
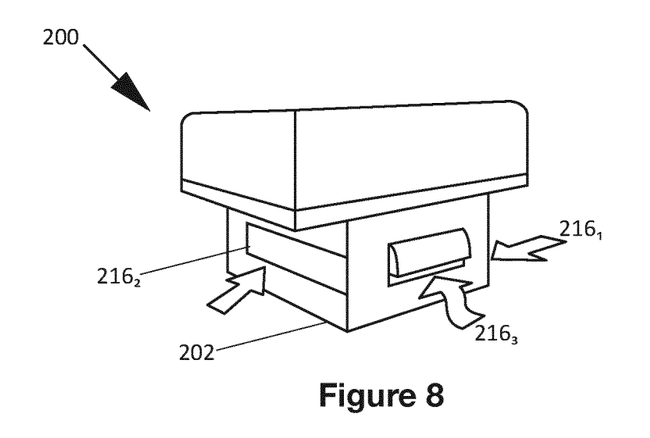
FIGS. 8, 9a, 9b, 10a and 10b illustrate plan views of further examples of a pest monitoring device.

For example, the housing of the pest monitoring device may have any suitable number of entrances configured in any suitable manner. As an illustrative embodiment, FIG. 8 illustrates a pest monitoring device 200 including a housing 202 with three entrances $216_{1-3}$. In this example, the entrances are all of a different configuration. Specifically, the housing 202 includes a flat entrance $216_1$ and a sloped entrance $216_2$ (i.e. sloped from ground level upwardly towards the interior surface). The housing 202 further includes a covered slot entrance, or pit-fall trap entrance, $216_3$, elevated above the interior surface such that pests may be trapped inside the housing (or at least prevented from exiting through the same entrance) once they have passed through the trap entrance $216_3$. Other examples may include one or more of any of the illustrated entrance types.

Figure 9A:
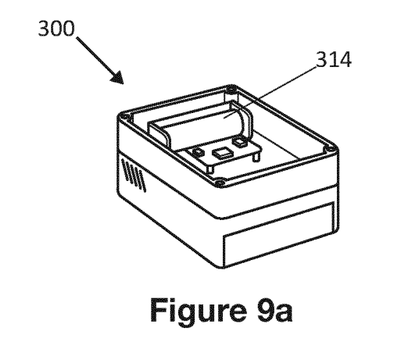
Figure 9B:
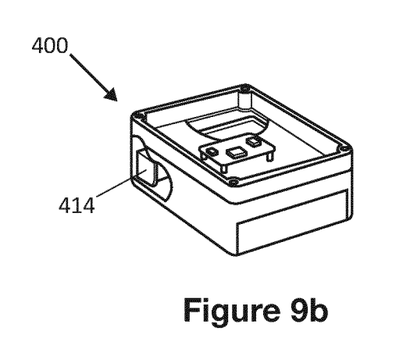

The battery may be positioned in any suitable position. As an example, FIGS. 9a and 9b illustrate pest monitoring devices 300 and 400 respectively. In the pest monitoring device 300, the battery 314 is located in an upper portion of the pest monitoring device (for example within the casing, adjacent to the 'monitoring components'). In the pest monitoring device 400, the battery 414 is located in a lower portion of the pest monitoring device (for example within, or adjacent to, the housing including the interior surface). As a result the pest monitoring device 400 has a lower profile relative to the pest monitoring device 300.

Figure 10A:
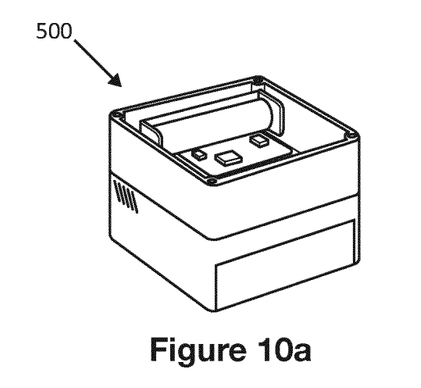
Figure 10B:
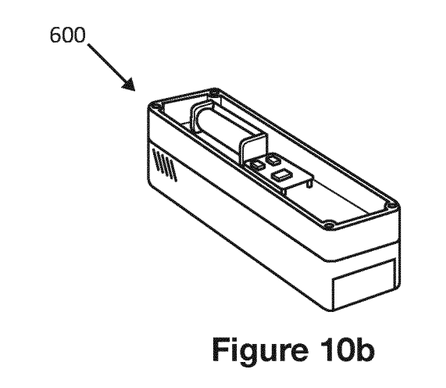

The pest monitoring device may be of any suitable size/profile depending on the pest being monitoring and/or the space in which the device is intended to be used. FIGS. 10a and 10b illustrate pest monitoring devices 500 and 600, respectively, of differing sizes and profiles. The pest monitoring device 500 has a smaller footprint compared to that of previous examples (for example for monitoring smaller pests). The pest monitoring device 600 has a narrow profile (for example for positioning in narrow spaces).

In other embodiments, the pest monitoring device 100 may include pheromones, chemical attractants ($CO_2$) or other odorous materials found attractive by the pest.

In some examples, there may be no tack or adhesive substance on the interior surface for immobilising pests. In such examples, the pest may move between monitoring operations.

In some examples, the reflected light data may be received by the optical sensor via a mirror positioned within the housing/casing. That is, a mirror may be positioned so as to reflect light from the interior surface towards the optical sensor. As such, the optical sensor does not have to be positioned as close to, or directly above, the interior surface. This provides flexibility on the placement of components within the pest monitoring device.

In the examples described above the monitoring components are positioned within a casing, separate to the housing. However, in other examples the housing may be housed within, or integral with, the casing.

In some examples, the monitoring components may be releasably coupled to the housing. In some examples this is as a result of the casing (housing the monitoring components) being releasably coupled to the housing. This allows the monitoring components to be used 'modularly' with separate housings. That is, the monitoring components may be provided as part of a modular system with one or more housings. The monitoring components may then be used with any one of the one or more housings, depending on the intended use of the arrangement (for example, the pests to be detected and/or the intended location of the pest monitoring device).

Put another way, a kit of parts may include two or more housings, each having an interior surface for accommodating pests thereon and a casing as described above (or simply means for detecting a pest on an interior surface of the housings). The casing is configured such that in use the casing may be releasably coupled to any/each of the housings. For example, the kit of parts may include a first housing sized and configured for monitoring/capturing pests of a first size (for example, cockroaches) and a second housing sized and configured for monitoring/capturing pests of a second size (for example, bedbugs). For example, a larger housing may be needed when monitoring for larger pests (that is, the optical sensor may need to be further away from the interior surface).

It will be clear to a person skilled in the art that features described in relation to any of the embodiments described above can be applicable interchangeably between the different embodiments. For example, the method steps presented in the flow diagrams of FIGS. 4 to 7 may be combined or used interchangeably in any suitable manner. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A pest monitoring device, the device comprising:
   a housing;
   an optical sensor configured to generate optical data related to an interior surface within the housing;
   a communication means configured to transmit information to an external receiver;
   a battery system, wherein the pest monitoring device is powered by the battery system;
   a tack or adhesive substance on the interior surface of the housing configured to immobilise pests; and
   at least one processor or controller in communication with the optical sensor and the communication means, wherein the at least one processor or controller is configured to:
   wake-up the pest monitoring device at a periodic time, wherein the wake-up activates the optical sensor to capture an image as optical data, receive optical data from the optical sensor, discretize the received optical data into a plurality of discretized blocks to form a preset analysis matrix, each discretized block including optical data corresponding to a separate segment of the interior surface, select a block of the plurality of discretized blocks as optical data relating to at least one segment of the interior surface, the optical data relating to the at least one segment being arranged as a plurality of pixels;

evaluate if the optical data corresponding to the at least one segment meets a pre-determined condition associated with the interior surface by:

counting the number of pixels of the plurality of pixels which indicate a light intensity below a pre-determined intensity value; and determining if the number of pixels having the light intensity below the pre-determined intensity limit is greater than or equal to a pre-determined pixel threshold value;

determine, based on whether the optical data corresponding to the at least one segment meets the pre-determined condition associated with the interior surface, if there is an indication of a pest on the interior surface, mark the block of the plurality of the discretized in the preset analysis matrix if there is an indication of a pest on the interior surface, select non-analysed blocks from the preset analysis matrix until no blocks remain in the preset analysis matrix, transmit information through the communication means to the external receiver if the number of marked blocks is greater than or equal to a threshold number of discretized blocks, and set the pest monitoring device to sleep after no blocks remain in the preset analysis matrix.

2. The device of claim 1, wherein the transmitted information comprises the optical data corresponding to the segments of the interior surface from which an indication of a pest has been determined.

3. The device of claim 1, wherein the optical data includes light intensity.

4. The device of claim 1, wherein the optical sensor and the processor are releasably coupled to the housing.

5. The device of claim 4, wherein the pest monitoring device further includes a casing, wherein the optical sensor and the processor are at least partially housed within the casing, wherein the casing is releasably coupled to the housing.

6. A pest trap comprising the device as claimed in claim 1.

7. The device of claim 1, wherein the preset analysis matrix comprises an ignore list of blocks from the plurality of discretized blocks, wherein the at least one processor or controller is configured to determine whether a block is on the ignore list and blocks on the ignore list are not analysed.

8. The device of claim 7, wherein the at least one processor or controller is configured to add a marked block to the ignore list.

9. The device of claim 1, wherein the at least one processor or controller is configured to clear the image data and data in the analysis matrix after no blocks remain in the preset analysis matrix.

10. The device of claim 1, further comprising a light source configured to illuminate the interior surface when the optical sensor captures the image.

* * * * *